N. SWICKARD.

Improvement in Dumping-Platforms.

No. 129,618. Patented July 16, 1872.

Witnesses:
Heinr. F. Bruns
R. B. Bacon

Inventor:
Noah Swickard
by Coburn & Munday
his Attys

UNITED STATES PATENT OFFICE.

NOAH SWICKARD, OF GALVA, ASSIGNOR TO HIMSELF AND CHARLES S. DOLE, OF CHICAGO, ILLINOIS.

IMPROVEMENT IN DUMPING-PLATFORMS.

Specification forming part of Letters Patent No. 129,618, dated July 16, 1872.

Specification describing certain Improvements in "Dumping-Tracks," invented by NOAH SWICKARD, of Galva, in the county of Henry and State of Illinois.

Nature of the Invention.

This invention relates to improvements in the construction of dumping platforms or tracks for discharging the contents of wagons or cars laden with grain, coal, or other similar material, and discharging it into bins and chutes; and the invention consists in the first place in providing two bins with a common aperture to admit the grain, so arranged by means of a central-hinged partition that the grain may be dumped through the trap into either of the bins at pleasure from the vehicle dumped, as will be more fully described; and it further consists in the novel construction of the apparatus for detaining and releasing the tilting-platform, whereby the same is greatly simplified and prevented from obstructing the passage of the matter dumped or the descent of the platform, as will presently more at length appear; and it further consists in constructing the trap or door covering the entrance to the bins with a joint or hinge along its central line, so that said trap may be folded and caused to stand upright to serve as a guard or shield to prevent the grain, coal, or other matter dumped from shooting over and past the aperture, as may be better understood by the description hereinafter given; and it further consists in the novel way of pivoting the tilting-platform by means of semicircular notches cut in the longitudinal beams of said platform, which rests upon the rounded edge of a transverse supporting-beam, the advantage being the cheapness and the durability and ease with which the platform may be removed from its bearings, as will presently more at length appear.

Figure 1:
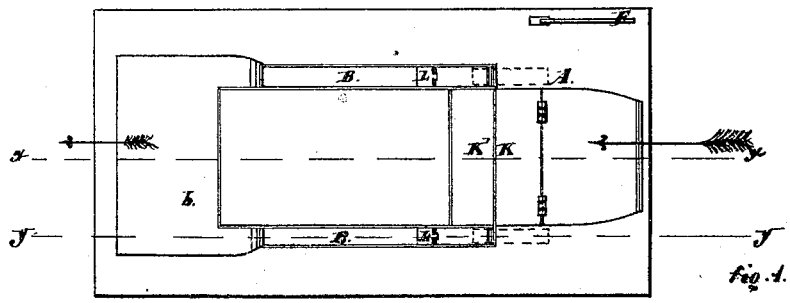
Figure 2:
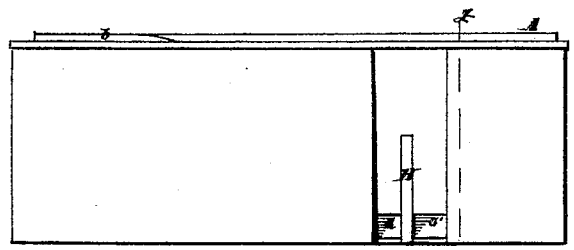
Figure 3:
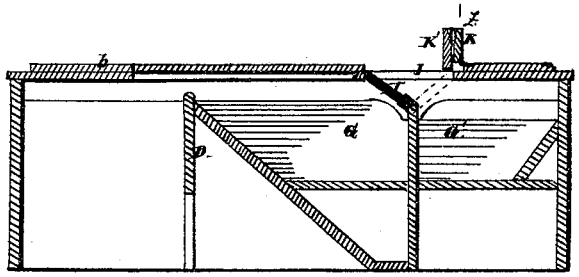
Figure 4:
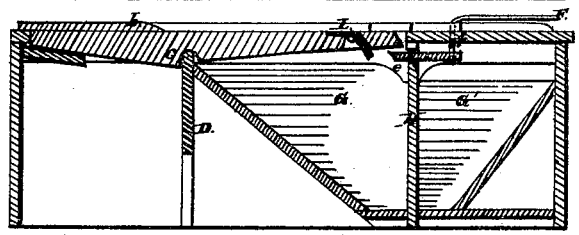
Figure 5:
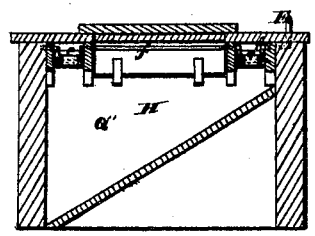

In the accompanying drawing, which forms part of this specification, Figure 1 represents a top or plan view of the elevated roadway and platform. Fig. 2 is a side elevation of the same. Fig. 3 is a vertical longitudinal section of the same taken on the line $x\,x$ of Fig. 1. Fig. 4 is a similar section taken on the line $y\,y$ of Fig. 1, and Fig. 5 is a transverse vertical section of the same on the line $z\,z$ of Fig. 2.

To enable those skilled in the art to make and use my invention, I will proceed to describe the same with particularity, making use in so doing of the aforesaid drawing by letters of reference thereto.

General Description.

A represents the elevated roadway upon which the vehicle to be dumped is conveyed. B is the tilting track or platform, consisting of the two parallel beams B B, connected by the platform $b$. Said platform $b$ is united to the tilting-beams and moves therewith, serving to insure their simultaneous action, and offering a broad surface, so that should the track be depressed when the wagon is driven on the weight of the horses may serve to raise it in position. These beams are made with notches $c$, which rest upon the upper rounded edge of the beam or support D, and the roadway A is cut by apertures corresponding in size to the length and breadth of the beams B, so that when a wagon or other vehicle is driven upon the beams, which form a track, the weight will cause them to tilt down beneath the roadway, placing the vehicle in an inclined position. The said beams are, however, restrained from so tilting and held up in position by the sliding stops $e\,e$, which project under the free ends thereof, being attached to cranks upon the shaft $f$, to which is connected the lever F, projecting above the roadway, by the operation of which the said sliding stops may be withdrawn from under the beams of the tilting-track or replaced, at pleasure. G G' are two bins, with inclined sides, situated beneath the roadway and separated from each other by the vertical partition H, extending up nearly to the roadway. To the upper edge of this partition is hinged the valve I, long enough to reach to the edge at either side of the aperture J, which is for the admission of the dumpings to the bins. This valve may be thrown at will to either side of the aperture, causing the dumpings to flow into either of the bins desired. The aperture J is covered by a trap-door, hinged, as shown, to the roadway, and consisting of two parts, K K', of which K' is hinged to K, and K is hinged to the roadway, forming a folding door, so hinged that it may be placed erect, as shown in Fig. 3 of the drawing, in which position it acts to prevent the dumpings from overshooting the aperture J.

The vehicle containing grain or other matter to be dumped is driven upon the roadway in the direction of the arrows until the wheels rest upon the beams B; an automatic lock, L, of ordinary design, retains the wheels from backing. The lever F is now thrown up, which withdraws the stops $c$ $c$ from beneath the beams B, and the weight of the vehicle and load causes the said beams to tilt upon their pivot and to sink with the vehicle into an inclined position with the rear end the lowest. If the vehicle is a wagon the tail-board is now removed and the contents flow into one of the bins—the one for which the valve may have been opened. The vehicle being emptied is driven off at the opposite end, closing the tilt by changing the position of the weight, and being closed the weight of the lever and position of the crank-shaft cause the stops to reinstate themselves automatically, locking the tilt in position for the next load.

*Claims.*

Having thus fully described the construction and operation of my invention, what I claim, and desire to secure by Letters Patent, is—

1. In combination with a tilting dump-track, the double bin G G', divided by a partition, H, to the top of which is hinged the valve I, substantially as specified and shown.

2. The combination and arrangement of the lever F, cranked shaft $f$, sliding stops $e$ $e$, and tilting-platform $b$ B B, substantially as specified and shown.

3. The two-part folding trap K K', in combination with the bins and tilting dump-track, substantially as specified.

4. The combination, in a tilting dump-track, of the platform $b$ B B provided with semicircular notches $c$ and the support D having a rounded upper edge, substantially as specified and shown.

NOAH SWICKARD.

Witnesses:
JOHN W. MUNDAY,
HEINR. F. BRUNS.